(12) United States Patent
Cho

(10) Patent No.: US 7,931,998 B2
(45) Date of Patent: Apr. 26, 2011

(54) CATALYST FOR FUEL CELL AND FUEL CELL COMPRISING THE SAME

(75) Inventor: Kyu-Woong Cho, Suwon-si (KR)

(73) Assignee: Samsung SDI Co., Ltd., Yongin-si (KR)

( * ) Notice: Subject to any disclaimer, the term of this patent is extended or adjusted under 35 U.S.C. 154(b) by 895 days.

(21) Appl. No.: 11/127,043

(22) Filed: May 10, 2005

(65) Prior Publication Data

US 2005/0260483 A1    Nov. 24, 2005

(30) Foreign Application Priority Data

May 11, 2004  (KR) .................. 10-2004-0032963

(51) Int. Cl.
*H01M 4/02* (2006.01)

(52) U.S. Cl. ......... 429/524; 429/405; 429/484; 429/485

(58) Field of Classification Search ............... 429/40, 429/42, 405, 484, 485, 524
See application file for complete search history.

(56) References Cited

U.S. PATENT DOCUMENTS

| | | | |
|---|---|---|---|
| 4,447,506 A | 5/1984 | Luczak et al. | |
| 4,822,699 A | 4/1989 | Wan | |
| 2001/0022960 A1* | 9/2001 | Kojima et al. | 423/657 |
| 2003/0054227 A1* | 3/2003 | Hiroshima et al. | 429/44 |

FOREIGN PATENT DOCUMENTS

| | | |
|---|---|---|
| JP | 56-155645 | 12/1981 |
| JP | 61-274747 | 12/1986 |
| JP | 01-210035 | 8/1989 |
| JP | 06-176766 | 6/1994 |
| JP | 08-117598 | 5/1996 |
| JP | 2000-000467 | 1/2000 |
| JP | 2002-015745 | 1/2002 |
| JP | 2002-42825 | 2/2002 |
| JP | 2003-15745 | 1/2003 |
| JP | 2003-045442 | 2/2003 |
| JP | 2004-510316 T | 4/2004 |

OTHER PUBLICATIONS

Patent Abstracts of Japan for Publication No. 2002-015745, Date of publication of application: Jan. 18, 2002, in the name of S. Terasono et al.
Patent Abstract of Japan, Publication No. 2002-042825, Published on Feb. 8, 2002, in the name of Wakita et al.
Patent Abstract of Japan, Publication No. 2003-015745, Published on Jan. 17, 2003, in the name of Tsuura et al.

* cited by examiner

*Primary Examiner* — Patrick Ryan
*Assistant Examiner* — Ben Lewis
(74) *Attorney, Agent, or Firm* — Christie, Parker & Hale, LLP

(57) ABSTRACT

A catalyst for a fuel cell includes platinum. The catalyst has an oxide reduction potential (ORP) that is not less than 430 mV. The ORP is estimated by a cyclic voltammetry test using a saturation calomel electrode.

22 Claims, 2 Drawing Sheets

CATALYST FOR FUEL CELL AND FUEL CELL COMPRISING THE SAME

CROSS REFERENCE TO RELATED APPLICATION

This application claims priority to and the benefit of Korean Patent Application No. 10-2004-0032963, filed on May 11, 2004 in the Korean Intellectual Property Office, the entire content of which is incorporated herein by reference.

FIELD OF THE INVENTION

The present invention relates to a catalyst for a fuel cell and a fuel cell including the same, and more particularly, to a catalyst for a fuel cell in which catalytic activity is improved and a fuel cell having the same.

BACKGROUND OF THE INVENTION

In a fuel cell, chemical reaction energy of a fuel is directly transformed into electric energy to generate an electric current. That is, the fuel cell includes an electrical power generating system in which the chemical reaction energy of the fuel (hydrogen or methanol) and an oxidation agent (oxygen or air) is directly transformed into the electrical energy.

The fuel cell continuously generates the electric current using the fuel supplied from the outside of the fuel cell without combustion or cycles of charge and discharge. The fuel cell has significantly higher energy efficiency than an electric generator using thermal dynamic energy produced by combustion of a fuel, because the fuel cell is not governed by thermodynamic efficiency limits.

Generally, the chemical reaction of a fuel (hydrogen) and an oxidation agent (oxygen) in a fuel cell produces water. Currently marketed fuel cells include polymer electrolyte membrane fuel cells (PEMFC) and phosphoric acid fuel cells (PAFC), which use an acidic electrolyte. Equations of the chemical reaction in a fuel cell in which an acidic electrolyte is used are as follows.

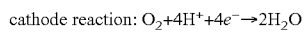
cathode reaction: $O_2+4H^++4e^-\rightarrow 2H_2O$

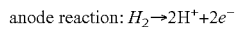
anode reaction: $H_2\rightarrow 2H^++2e^-$

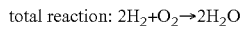
total reaction: $2H_2+O_2\rightarrow 2H_2O$

That is, when a fuel (commonly hydrogen) and an oxidation agent (commonly air) are respectively supplied to an anode and a cathode at the same time, energy is generated by an oxidation reaction of the fuel at the anode and an oxygen reduction reaction of the oxidation agent at the cathode caused by a catalyst, thereby resulting in the generation of electrons.

Efficiency of the catalyst is an important parameter to improve the efficiency of the fuel cell. Noble metals such as platinum, which is the most stable in an electro-chemical reaction, can be used as the catalyst. However, pure noble metals such as platinum may be too expensive to apply commercially in a fuel cell.

Therefore, several studies have been performed to develop an alloy-based catalyst that is capable of being substituted for pure noble metals such as platinum. For example, U.S. Pat. No. 4,447,506 discloses alloy catalysts such as Pt—Cr—Co and Pt—Cr and U.S. Pat. No. 4,822,699 discloses Pt—Ga and Pt—Cr.

The noble metals can also be supported (or coated) on a supporter such as carbon to reduce the amount used.

Japanese Patent Publication (No. 2002-42825) discloses a catalyst for a fuel cell having platinum particles of which 5 wt % or more are cubic shape and/or regular tetrahedron shape platinum particles to reduce the amount of platinum used and to improve efficiency. The reference discloses a method for preparing the catalyst that includes bubbling hydrogen in an aqueous solution formed by dissolving platonic chloride (II) potassium and sodium polyacrylate so as to generate a platinum colloid solution; adding a conductive carbon material to the platinum colloid solution; adjusting the pH level of the liquid mixture to be not greater than 3 or not less than 12; separating the colloidal particles from the liquid mixture along with the carbon material; and heat-treating the separated carbon material with the colloidal particles at 180 to 350° C.

Japanese Patent Publication (No. 2002-015745) discloses a catalyst in which a perfluorocarbon polymer including a sulfonic acid group and platinum or platinum alloy materials are supported in a carbon supporter. The fabricating method of the above-mentioned catalyst includes: dispersing carbon powders in an aqueous solution of platinum chloride acid; dissolving or dispersing a compound including elements which are capable of alloying with platinum when the platinum alloy is used instead of the platinum; performing adsorption of the compound including the platinum or the platinum alloy on the carbon powders through heating and stirring; controlling pH to the alkaline state if necessary; filtering, washing and drying the resultant; and performing heat-treatment under an inert gas atmosphere.

However, the catalytic activity of the above described platinum-based catalysts is not satisfactory and there remains a need for a catalyst for a fuel cell having an improved catalytic activity.

SUMMARY OF THE INVENTION

According to an embodiment of the present invention, a catalyst for a fuel cell has improved catalytic activity.

In another embodiment of the invention, a fuel cell includes the catalyst having improved catalytic activity.

One embodiment of the present invention provides a catalyst for a fuel cell including platinum. The catalyst has an oxide reduction potential (ORP) that is not less than 430 mV. The ORP is estimated by a cyclic voltammetry test using a saturation calomel electrode.

Another embodiment of the present invention provides a fuel cell including an electrolytic membrane, a cathode, an anode, and a catalyst layer on each of the cathode and the anode. The cathode and the anode are positioned respectively on both sides of the electrolytic membrane. The catalyst layer includes platinum. The catalyst layer has an ORP that is not less than 430 mV. The ORP is estimated by a cyclic voltammetry test using a saturation calomel electrode.

DETAILED DESCRIPTION

Figure 1:
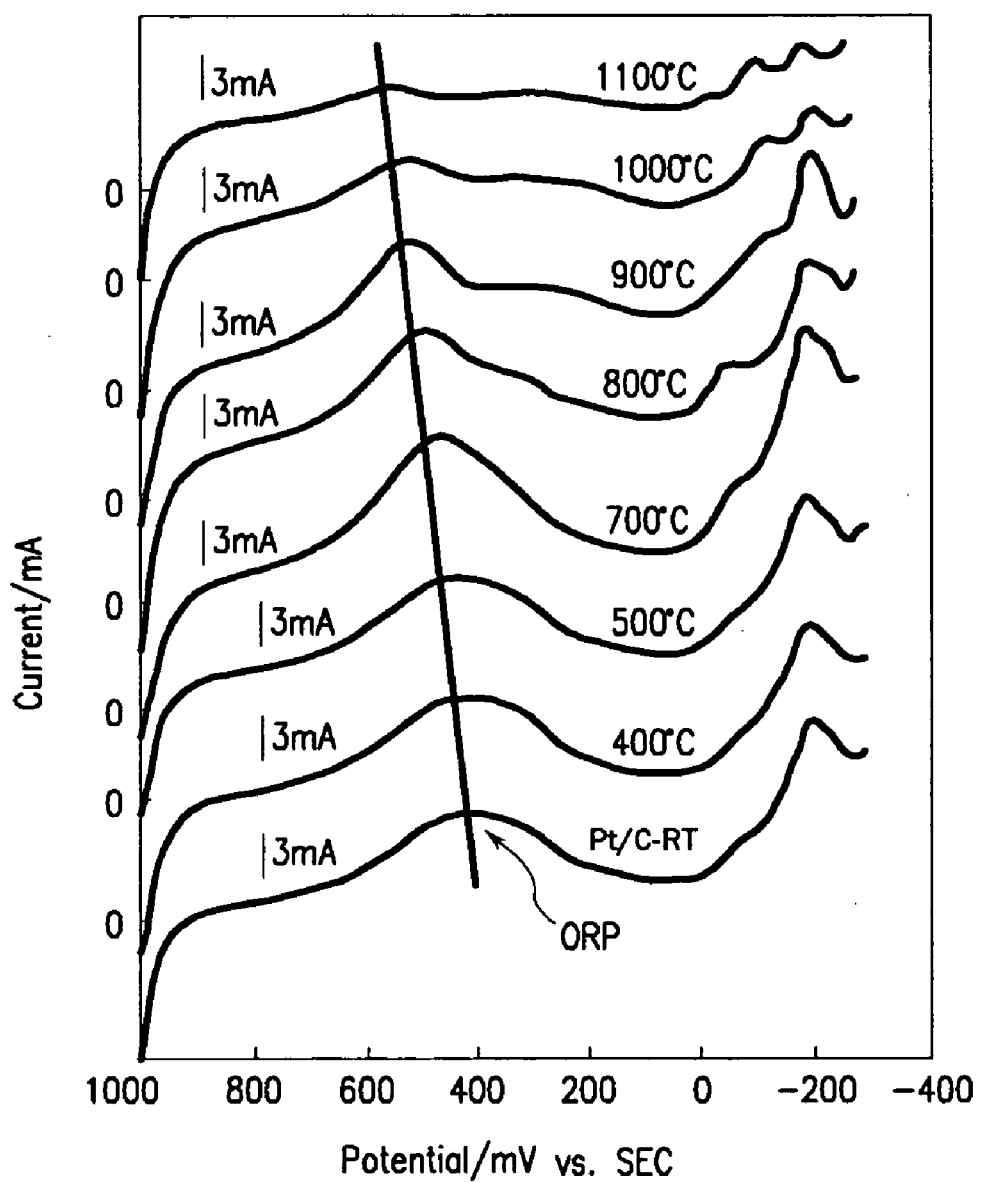
FIG. 1 is a graph showing ORP of catalysts fabricated according to Examples 1, 2, 3, 4, 5, 6, and 7 of the invention and Comparative Example 1.

The present invention relates to an economical catalyst in which catalytic activity is improved and thereby efficiency of a fuel cell is also improved. Since platinum, which has been widely used as a catalyst for a fuel cell, is too expensive to use in large quantities, mass activity, that is, current density obtained per unit weight of the platinum, should be maximized to improve an economic aspect of the fuel cell. In addition, according to an embodiment of the invention, improvements in the catalytic activity of a catalyst correspond to increases in mass activity of the catalyst.

In a typical fuel cell, it is known that an oxygen reduction reaction of a cathode is a rate-determining step (RDS), but the detailed mechanism of this oxygen reduction reaction is not yet well known. However, it is a predominant theory that water is produced when oxygen is separated from a catalytic or platinum surface after hydrogen approaches the platinum surface and reacts with the oxygen that is adsorbed on the platinum surface with a certain force thereon.

Noticing that the value of the adsorption force of oxygen on the platinum surface is closely associated with the reaction rate, and thereby the bonding force between the platinum and the oxygen is associated with the reaction rate, an embodiment of the present invention controls the electron distribution of the platinum according to a theory that the electron distribution of the platinum determines the bonding force between the platinum and the oxygen.

As shown below, several adsorption models of platinum and oxygen have been suggested, and it has been observed that the bonding force of the platinum and the oxygen affects the reaction mechanism.

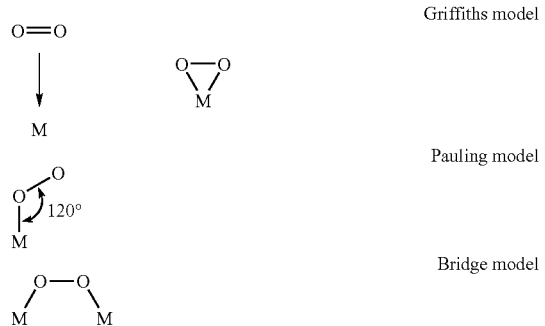

An embodiment of the present invention is accomplished by noticing what bonding force between oxygen and platinum affects the reaction mechanism and thereby affects total catalytic activity.

A catalyst for the fuel cell according to an embodiment of the present invention includes platinum. The oxidation reduction potential or oxide reduction potential (ORP) of the platinum is not less than 430 mV and more preferably between 430 to 560 mV.

The ORP of the platinum according to an embodiment of the invention is the potential at which the oxygen on the platinum is reduced, that is, the potential where the platinum is reduced again after oxidation. In other words, the ORP is a potential at which bonding between platinum and oxygen is broken, or a potential where a reduction peak appears in a range between 0.2 to 0.7 V in a saturated calomel electrode (SCE) scale. The ORP according to an embodiment of the invention is estimated by cyclic voltammetry using an SCE as a reference electrode. In one embodiment, the ORP was estimated in a 1 M sulfuric acid solution.

Since the ORP of the platinum in the catalyst for the fuel cell according to an embodiment of the present invention is not less than 430 mV, the reduction potential of the oxygen formed on the platinum increases during the rate-determining step, that is, during the oxygen reduction reaction, so that bonding of the platinum and the oxygen is broken even when only a small quantity of electrons is supplied. This catalyst allows the oxygen to be reduced more easily and rapidly than with a catalyst having an ORP of less than 430 mV.

In one embodiment, the particle size of the platinum used in the present invention is in the range between 30 and 150 Å. Properties of the catalyst are variably changed according to its particle size, especially if the activated surface area for catalyst reaction is changed. The particle size of the catalyst should be small because as the particle size becomes smaller, the activated surface area increases. However, it is difficult to reduce the particle size to 30 Å or less. If the particle size of the catalyst becomes 150 Å or more, the surface area of the catalyst becomes too small to be economical for application because of the large quantity that would be needed, and it is also not preferred because an excessive increase of heat treatment temperature is needed to fabricate the catalyst.

The ORP in an embodiment of the present invention is controlled according to the heat treatment process of the catalyst. Hereinafter, a fabricating method of the catalyst of an embodiment of the present invention is described.

To fabricate a platinum catalyst showing an ORP of 450 mV or more, platinum is heat-treated at a temperature of 400° C. or more. The preferable heat-treating temperature is 400 to 1500° C. The heat-treating process is performed for 1 to 5 hours under an atmosphere of nitrogen, hydrogen, or a mixed gas thereof. In one embodiment of the present invention, an alloy of platinum and transition elements may be used in a polymer electrolyte membrane fuel cell or a phosphoric acid fuel cell that uses an acidic electrolyte. In one embodiment, a fuel cell having a catalyst of the present invention includes an electrolytic membrane, and a cathode and an anode on which a catalyst layer of the present invention is formed. A carbon material such as non-woven carbon can be used as the cathode and/or the anode.

In addition, the fuel cell of the present invention includes a gas diffusion layer closely situated at sides of the cathode and the anode and a bipolar plate in which a flow foam is formed.

Figure 2:
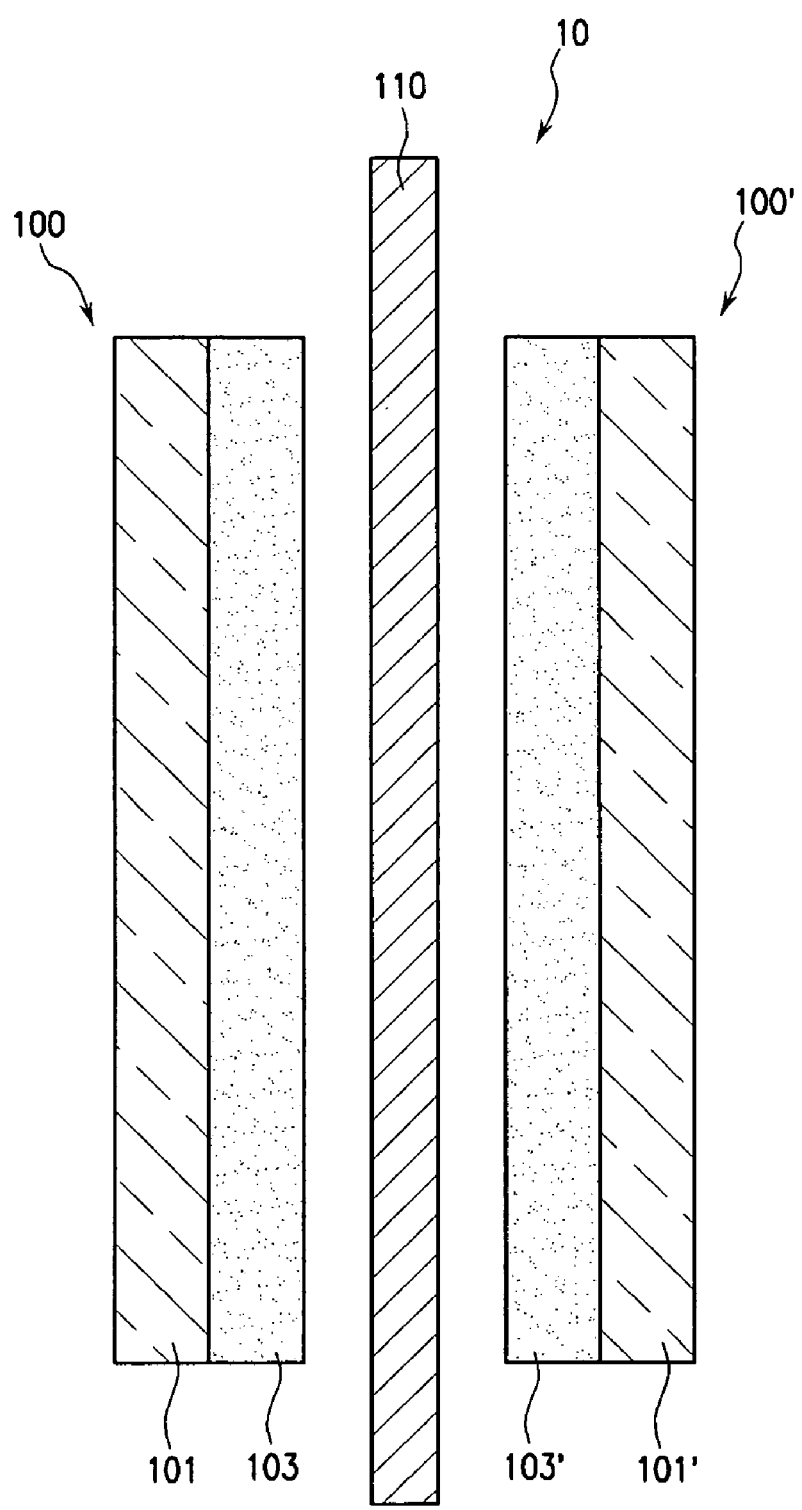
FIG. 2 is a schematic of a membrane-electrode assembly according to an embodiment of the present invention.

Referring to FIG. 2, a membrane-electrode assembly 10 of a fuel cell is shown. The membrane-electrode assembly 10 includes an electrolyte membrane 110, and an anode 100 and a cathode 100' which are placed on both sides of the electrolyte membrane 110. The anode 100 and the cathode 100' include electrode substrates 101, 101' and catalyst layers 103, 103', respectively.

The electrode substrate 101, 101' can include carbon paper, carbon cloth, and/or carbon felt, and they can be treated with polytetrafluoroethylene (PTFE) to be water-repellent. The electrode substrates 101, 101', can function both as gas diffusion layers as well as support layers for the membrane-electrode assembly 10.

Hereinafter, examples according to the present invention and a comparative example are described. However, the present invention is not limited by these examples.

COMPARATIVE EXAMPLE 1

To prepare a catalyst for a fuel cell, platinum (Johnson Matthey Co. 10 wt % of platinum supported by a carbon supporter), supported by a commercially available carbon supporter was heat-treated for 2.5 hours at room temperature under a reducing atmosphere of a mixture of nitrogen and hydrogen gases ($N_2:H_2=1:3$).

EXAMPLE 1

A catalyst was prepared by the same method as in Comparative Example 1, except that the heat-treating was performed at 400° C.

EXAMPLE 2

A catalyst was prepared by the same method as in Comparative Example 1, except that the heat-treating was performed at 500° C.

EXAMPLE 3

A catalyst was prepared by the same method as in Comparative Example 1, except that the heat-treating was performed at 700° C.

EXAMPLE 4

A catalyst was prepared by the same method as in Comparative Example 1, except that the heat-treating was performed at 800° C.

EXAMPLE 5

A catalyst was prepared by the same method as in Comparative Example 1, except that the heat-treating was performed at 900° C.

EXAMPLE 6

A catalyst was prepared by the same method as in Comparative Example 1, except that the heat-treating was performed at 1000° C.

EXAMPLE 7

A catalyst was prepared by the same method as in Comparative Example 1, except that the heat-treating was performed at 1100° C.

It was found that the particle sizes of the catalysts fabricated according to Examples 1 to 7 and Comparative Example 1 are in the range between about 30 and 150 Å.

The ORPs of the catalysts fabricated according to Examples 1 to 7 and Comparative Example 1 were estimated by a cyclic voltammetry (CV) test. A saturated calomel electrode (SCE) was used as a release electrode. Moreover, a working electrode was fabricated by coating a paste on a gas diffusion layer of a carbon paper. The paste was fabricated by mixing 90 wt % of the prepared catalyst and 10 wt % of polytetrafluoroethylene (used as binder) based on a total weight in a solution in which a solvent of water and isopropyl alcohol were mixed at the volume ratio of 1:1. A platinum plate was used as a counter electrode.

Both the working electrode and the counter electrode were fabricated in a circle plate shape with a diameter of 1 mm. The CV test was performed in a 1 M sulfuric acid aqueous solution, and the scan speed was 10 mV/sec. Table 1 and FIG. 1 show the resultant ORPs. In FIG. 1, each catalyst accepts electrons to be oxidized in the case that the ORP is positive, and it supplies electrons to be reduced in the case that the ORP is negative.

TABLE 1

| | Catalyst | ORP mV(vs. SCE 1M $H_2SO_4$) |
|---|---|---|
| Comparative Example 1 | PtRT | 425 |
| Example 1 | Pt400 | 431 |
| Example 2 | Pt500 | 434 |
| Example 3 | Pt700 | 460 |
| Example 4 | Pt800 | 490 |
| Example 5 | Pt900 | 511 |
| Example 6 | Pt1000 | 528 |
| Example 7 | Pt1100 | 555 |

Referring to Table 1, PtRT is referred to the platinum catalyst that was treated at room temperature, Pt400 is referred to the platinum catalyst that was treated at 400° C., Pt500 is referred to the platinum catalyst that was treated at 500° C., Pt700 is referred to the platinum catalyst that was treated at 700° C., Pt800 is referred to the platinum catalyst that was treated at 800° C., Pt900 is referred to the platinum catalyst that was treated at 900° C., Pt1000 is referred to the platinum catalyst that was treated at 1000° C., and Pt1100 is referred to the platinum catalyst that was treated at 1100° C.

As shown in Table 1 and FIG. 1, it was found that the ORP is 425 mV in Comparative Example 1, of which heat-treating temperature was room temperature. Also shown in Table 1 and FIG. 1, ORPs are 431 mV, 434 mV, 460 mV, 490 mV, 511 mV, 528 mV, and 555 mV in respective Examples 1, 2, 3, 4, 5, 6 and 7, in which they were respectively heat-treated at 400° C., 500° C., 700° C., 800° C., 900° C., 1000° C. and 1101° C. Therefore, the catalysts fabricated according to Examples 1 to 7 are superior to that according to Comparative Example 1 in terms of catalytic activity.

Table 2 shows the estimated activities of the catalysts fabricated according to Examples 1 to 7 and Comparative Example 1. In Table 2, the catalytic activity is expressed as a mass activity, that is, the value of the current obtained by a half cell test is divided by weight of the catalyst being tested.

TABLE 2

| | Catalyst | mass activity (A/g) |
|---|---|---|
| Comparative Example 1 | PtRT | 70.0 |
| Example 1 | Pt400 | 77.6 |
| Example 2 | Pt500 | 95.2 |
| Example 3 | Pt700 | 98.3 |
| Example 4 | Pt800 | 93.1 |
| Example 5 | Pt900 | 108 |
| Example 6 | Pt1000 | 81.7 |
| Example 7 | Pt1100 | 75.9 |

As shown in Table 2, it is confirmed that the catalysts fabricated according to Examples 1 to 7 are superior to that according to Comparative Example 1 as indicated by their higher values in mass activities.

While the invention has been described in connection with certain exemplary embodiments, it is to be understood by those skilled in the art that the invention is not limited to the disclosed embodiments, but, on the contrary, is intended to cover various modifications included within the spirit and scope of the appended claims and equivalents thereof.

What is claimed is:
1. A catalyst for a fuel cell comprising:
platinum, the platinum having an average particle size between about 30 and about 150 Å, wherein the catalyst has an oxide reduction potential (ORP) not less than 430 mV, wherein the ORP is estimated by a cyclic voltammetry test using a saturation calomel electrode.

2. The catalyst for the fuel cell according to claim 1, wherein the ORP is between about 430 and 560 mV.

3. The catalyst for the fuel cell according to claim 1, wherein the cyclic voltammetry test is performed in a sulfuric acid aqueous solution.

4. The catalyst for the fuel cell according to claim 1, wherein the platinum is a not less than 400° C. heat-treated platinum.

5. The catalyst for the fuel cell according to claim 4, wherein the platinum is a between 400 and 1500° C. heat-treated platinum.

6. The catalyst for the fuel cell according to claim 4, wherein the platinum is a reducing atmosphere heat-treated platinum.

7. The catalyst for the fuel cell according to claim 6, wherein the reducing atmosphere heat-treated platinum comprises a nitrogen atmosphere heat-treated platinum, a hydrogen atmosphere heat-treated platinum, or a nitrogen and hydrogen atmosphere heat-treated platinum.

8. The catalyst for the fuel cell according to claim 4, wherein the platinum is a 1 to 5 hour heat-treated platinum.

9. The catalyst for the fuel cell according to claim 1, wherein the platinum is a non-alloyed platinum.

10. A fuel cell comprising:
an electrolytic membrane;
a cathode and an anode, the electrolytic membrane being between the cathode and the anode;
a catalyst layer on each of the cathode and the anode, the catalyst layer comprising platinum, the platinum having an average particle size between about 30 and about 150 Å, wherein the catalyst layer has an oxide reduction potential (ORP) being not less than 430 mV, wherein the ORP is estimated by a cyclic voltammetry test using a saturation calomel electrode.

11. The fuel cell according to claim 10, wherein the ORP is between about 430 and 560 mV.

12. The fuel cell according to claim 11, wherein the cyclic voltammetry test is performed in a sulfuric acid aqueous solution.

13. The fuel cell according to claim 10, wherein the platinum is a not less than 400° C. heat-treated platinum.

14. The fuel cell according to claim 13, wherein the platinum is a between 400 and 1500° C. heat-treated platinum.

15. The fuel cell according to claim 13, wherein the platinum is a reducing atmosphere heat-treated platinum.

16. The fuel cell according to claim 15, wherein the reducing atmosphere heat-treated platinum comprises a nitrogen atmosphere heat-treated platinum, a hydrogen atmosphere heat-treated platinum, or a nitrogen and hydrogen atmosphere heat-treated platinum.

17. The fuel cell according to claim 13, wherein the platinum is a 1 to 5 hour heat-treated platinum.

18. A method for preparing a catalyst for a fuel cell comprising:
coating platinum onto a carbon substrate to form a platinum-coated substrate, the platinum having an average particle size between about 30 and about 150 Å;
heat-treating the platinum coated substrate to form the catalyst, wherein the catalyst has an oxide reduction potential (ORP) not less than 430 mV as estimated by a cyclic voltammetry test using a saturation calomel electrode.

19. The method of claim 18, wherein the platinum coated substrate is heat-treated at a temperature between about 400 and 1500° C. in a reducing atmosphere.

20. The method of claim 19, wherein the platinum coated substrate is heat-treated from about 1 to 5 hours.

21. The method of claim 19, wherein the reducing atmosphere comprises nitrogen.

22. The method of claim 19, wherein the reducing atmosphere comprises hydrogen.

* * * * *